United States Patent
Gatti

(10) Patent No.: US 10,107,168 B2
(45) Date of Patent: Oct. 23, 2018

(54) METHOD AND APPARATUS TO CONTROL REGENERATION OF A PARTICULATE FILTER OF AN EXHAUST GAS FEEDSTREAM

(71) Applicant: GM GLOBAL TECHNOLOGY OPERATIONS LLC, Detroit, MI (US)

(72) Inventor: Luca Gatti, Turin (IT)

(73) Assignee: GM Global Technology Operations LLC, Detroit, MI (US)

(*) Notice: Subject to any disclaimer, the term of this patent is extended or adjusted under 35 U.S.C. 154(b) by 79 days.

(21) Appl. No.: 15/334,337

(22) Filed: Oct. 26, 2016

(65) Prior Publication Data

US 2018/0112579 A1 Apr. 26, 2018

(51) Int. Cl.
 *F01N 9/00* (2006.01)
 *F01N 3/025* (2006.01)

(52) U.S. Cl.
 CPC ........... *F01N 9/002* (2013.01); *F01N 3/0253* (2013.01); *F01N 2430/00* (2013.01)

(58) Field of Classification Search
 CPC ........ F01N 3/023; F01N 3/0253; F01N 3/035; F01N 9/002; F01N 2900/1606
 See application file for complete search history.

(56) References Cited

U.S. PATENT DOCUMENTS

| 2009/0188243 A1* | 7/2009 | Williams | F01N 3/023 60/295 |
| 2012/0031072 A1* | 2/2012 | Gonze | F01N 3/101 60/273 |

\* cited by examiner

*Primary Examiner* — Jonathan Matthias
(74) *Attorney, Agent, or Firm* — Quinn IP Law

(57) ABSTRACT

Operation of the direct-injection internal combustion engine includes executing a particulate filter service routine in response to a regeneration command, wherein the particulate filter service routine includes a warm-up phase and a steady-state phase. The service routine includes determining a first temperature in the exhaust gas feedstream upstream of the oxidation catalyst and a second temperature in the exhaust gas feedstream downstream of the oxidation catalyst and upstream of the particulate filter, and determining an exhaust gas flowrate and a soot level in the particulate filter. A preferred warm-up temperature gradient in the particulate filter is determined based upon the exhaust gas flowrate and the soot level. The warm-up phase of the particulate filter service routine is determined based upon the preferred warm-up temperature gradient. Operation of the engine is controlled to achieve the preferred warm-up temperature gradient in the particulate filter during the warm-up phase.

19 Claims, 2 Drawing Sheets

METHOD AND APPARATUS TO CONTROL REGENERATION OF A PARTICULATE FILTER OF AN EXHAUST GAS FEEDSTREAM

INTRODUCTION

Manufacturers of internal combustion engines develop engine control strategies to satisfy customer demands and meet various requirements. One such engine control strategy includes operating an engine at an air/fuel ratio that is lean of stoichiometry to provide benefits related to fuel economy and emissions. Such engines include both compression-ignition (diesel) and lean-burn spark-ignition engines. An engine operating in a lean air/fuel ratio region may have elevated combustion temperatures, which may lead to increased particulate matter emissions. One strategy for addressing particulate matter emissions includes employing a particulate filter in the exhaust gas feedstream, with an associated control routine to periodically regenerate the particulate filter when certain operating conditions are achieved. A specific particulate filter may reach a level of stored particulate matter that is greater than a maximum permissible threshold before the engine and exhaust aftertreatment system achieves the requisite operating conditions to run the control routine to regenerate the particulate filter. A diagnostic trouble code may be indicated as a result, which may cause illumination of an indicator lamp on a vehicle dashboard or vehicle information system to notify the vehicle operator and indicate a need to service the vehicle.

SUMMARY

A direct-injection internal combustion engine is described and includes an exhaust aftertreatment system composed of an oxidation catalyst disposed upstream of a particulate filter, and a controller that is disposed to execute a control routine for controlling its operation. The direct-injection internal combustion engine is disposed to supply an exhaust gas feedstream to an exhaust aftertreatment system, wherein the exhaust aftertreatment system includes an oxidation catalyst disposed upstream of a particulate filter. Controlling operation of the direct-injection internal combustion engine includes executing, via the controller, a particulate filter service routine in response to a command to regenerate the particulate filter, wherein the particulate filter service routine includes a warm-up phase and a steady-state phase. The service routine includes determining a first temperature in the exhaust gas feedstream upstream of the oxidation catalyst and a second temperature in the exhaust gas feedstream downstream of the oxidation catalyst and upstream of the particulate filter, and determining an exhaust gas flowrate and a soot level in the particulate filter. A preferred warm-up temperature gradient in the particulate filter is determined based upon the exhaust gas flowrate and the soot level. The warm-up phase of the particulate filter service routine is determined based upon the preferred warm-up temperature gradient. Operation of the engine is controlled to achieve the preferred warm-up temperature gradient in the particulate filter during the warm-up phase.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Furthermore, the disclosure, as illustrated and described herein, may be practiced in the absence of an element that is not specifically disclosed herein. Moreover, for the purpose of clarity, certain technical material that is understood in the related art has not been described in detail in order to avoid unnecessarily obscuring the disclosure. As employed herein, the term "upstream" and related terms refer to elements that are towards an origination of a flow stream relative to an indicated location, and the term "downstream" and related terms refer to elements that away from an origination of a flow stream relative to an indicated location.

Figure 1:
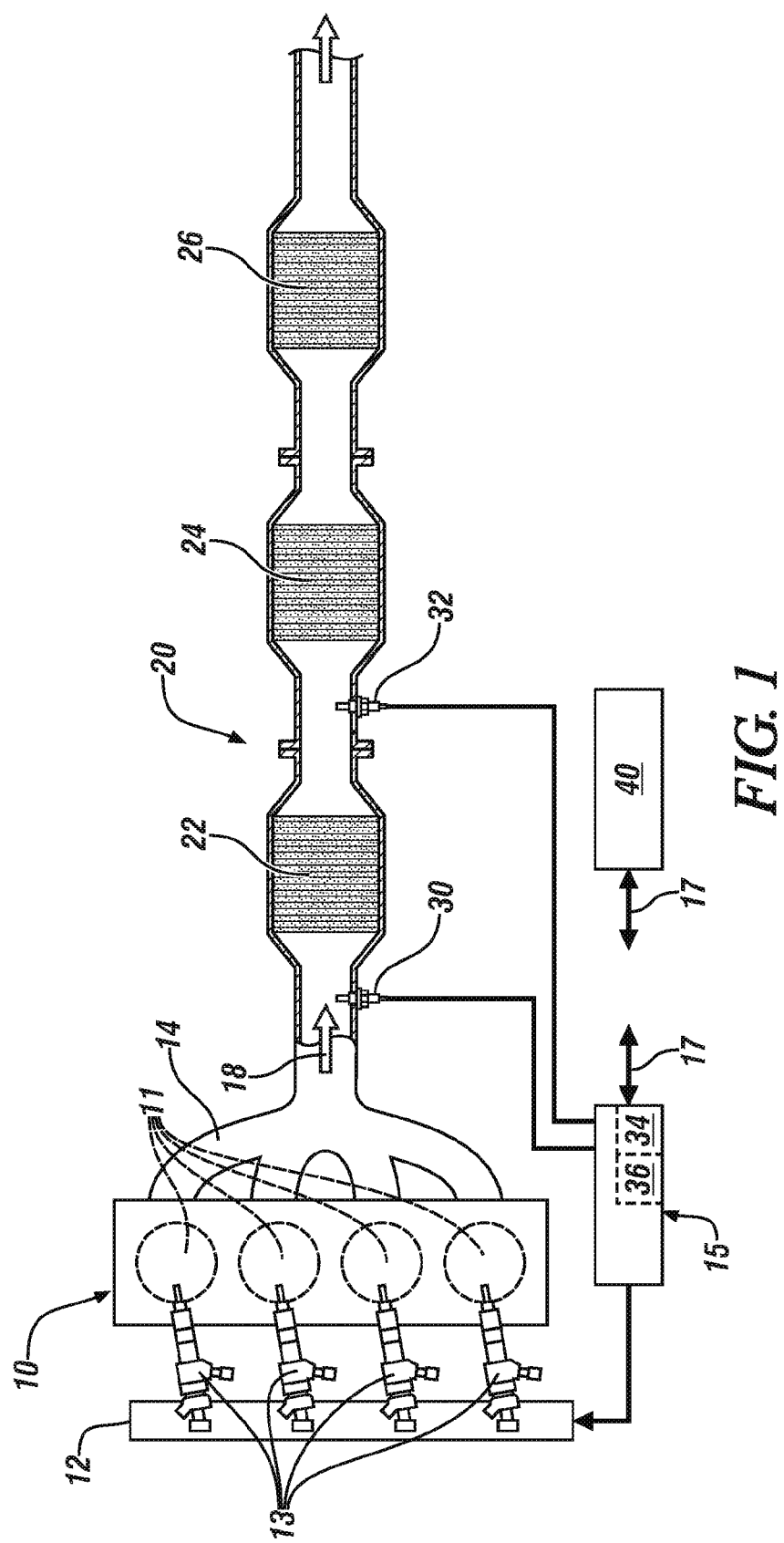
FIG. 1 schematically illustrates an embodiment of an internal combustion engine and exhaust aftertreatment system including an oxidation catalyst disposed upstream to a particulate filter, in accordance with the disclosure.

Referring to the drawings, FIG. 1 schematically illustrates an embodiment of an internal combustion engine (engine) 10 that includes a direct-injection fuel system 12 including a plurality cylinders 11, a corresponding plurality of direct-cylinder injection fuel injectors 13 and an exhaust manifold 14 that fluidly connects to an exhaust aftertreatment system 20. Operation of the engine 10 is controlled by a controller 15. The engine 10 may be any suitable multi-cylinder internal combustion engine that employs direct or in-cylinder fuel injection and operates lean of stoichiometry, including, by way of non-limiting examples, a compression-ignition engine or a lean-burn spark-ignition engine. The exhaust manifold 14 is disposed to entrain exhaust gases that are output from the engine 10 and channel them into an exhaust gas feedstream 18 that flows to the exhaust aftertreatment system 20 for purification prior to expulsion into the atmosphere. In one embodiment, the engine 10 is disposed on a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The exhaust aftertreatment system 20 preferably includes an oxidation catalyst 22 that is disposed upstream of a particulate filter 24, which may be disposed upstream of another exhaust purification device, such as an ammonia-selective catalyst reduction device (SCR) 26 and accompanying reductant dosing system. The exhaust aftertreatment system 20 may also include other devices that are suitable for oxidizing, reducing, filtering or otherwise purifying constituent elements of exhaust gases in the exhaust gas feedstream 18. The arrangement and use of specific devices for treating exhaust gases is not restricted to a specific design configuration or layout. Details related to design and configuration of the oxidation catalyst 22, the particulate filter 24 and other exhaust purification devices are specific to the configuration of the engine 10. In one embodiment, the particulate filter 24 includes a substrate that is fabricated from extruded ceramic materials such as cordierite, and may be arranged as a wall-flow filter device that is able to remove particulate matter from the exhaust gas feedstream. When the substrate is arranged as a wall-flow filter device, adjacent flow channels are blocked on alternate axial ends. This allows the exhaust gas feedstream to enter a channel from an inlet, flow through the channel walls, and exit the filter from a different channel leading to the outlet. Particulates in the exhaust gas stream may be trapped in the particulate filter and subsequently oxidized.

The exhaust aftertreatment system 20 also includes sensors and estimation techniques for monitoring parameters related to the exhaust gas feedstream 18, preferably including a first temperature sensor 30 arranged to monitor a first temperature (T1) in the exhaust gas feedstream 18 upstream of the oxidation catalyst 22 and a second temperature sensor 32 arranged to monitor a second temperature (T2) in the exhaust gas feedstream 18 downstream of the oxidation catalyst 22 and upstream of the particulate filter 24. Another sensor may include a mass air flow sensor, e.g., an intake air mass air flow sensor, which may be employed to monitor intake airflow, from which an exhaust gas flowrate may be estimated or otherwise determined. Alternatively, the mass air flow may be estimated or otherwise determined using estimation techniques and routines, such as those based upon speed-density calculations. Other sensors, e.g., an ammonia ($NH_3$) sensor, an air/fuel ratio sensor, or another suitable exhaust gas constituent sensor may also be employed. Other sensors, such as exhaust pressure sensors or delta pressure sensors may also be employed. The aforementioned sensors communicate with the controller 15, e.g., via direct communication lines. The first and second temperature sensors 30, 32 may be suitable sensing devices having signal processing circuits and/or algorithmic routines that perceive a physical or chemical stimulus and transform such perceived stimulus to an electrical signal that correlates to a state of a parameter of interest, e.g., temperature.

The exhaust gas feedstream upstream of the SCR 10 may be evaluated employing a virtual sensor 34 that is configured to estimate an amount of particulate matter (soot) in the exhaust gas feedstream 18 that may be captured and stored in the particulate filter 24 during engine operation. The virtual sensor 34 may be further configured to determine the amount of particulate matter that is subsequently oxidized during a regeneration event. The virtual sensor 34 may be in the form of one or more algorithms, equations and/or calibration lookup tables that are resident in the controller 15 and are employed to determine the magnitude of particulate matter in the exhaust gas feedstream 18 based upon present engine operating conditions. Algorithms, equations and/or calibration lookup tables for determining the magnitude of particulate matter in an exhaust gas feedstream are known to those skilled in the art, and thus not described in further detail herein.

The controller 15 is preferably a modular component of a distributed controller architecture having a plurality of controllers configured to provide coordinated control of various systems including the engine 10 and other powertrain and driveline components and systems. The controller 15 is operable to monitor inputs from sensing devices, synthesize pertinent information, and execute algorithms to control various actuators in order to achieve control targets, including such parameters as fuel economy, emissions, performance, drivability, and protection of hardware. The controller 15 is shown in signal communication with the engine 10, and functions to acquire data from sensors and control a variety of actuators associated with engine 10. In operation, the controller 15 receives an engine torque command, and generates a desired torque output, based upon the vehicle operator inputs. Exemplary engine operating parameters that may be measured or inferred by the controller 15 using the aforementioned sensors and other sensors and routines include engine coolant temperature, engine oil temperature, and/or other temperature, crankshaft rotational speed (RPM) and position, manifold absolute pressure, ambient air flow and temperature and ambient air pressure, and combustion parameters including air/fuel ratio, location of peak combustion pressure and other parameters.

A service tool 40 may be disposed to communicate with the controller 15 via a communication link 17, e.g., a diagnostic link connector that connects to a direct-wired input/output port of the controller 15 or via a wireless link connector that executes a short-range communication protocol. The service tool 40 includes suitable interface hardware and control routines that enable communication with the controller 15. Service tools are known to those skilled in the art, and thus not described in further detail.

The terms controller, control module, module, control, control unit, processor and similar terms refer to programmable data processing apparatuses in the form of one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or control routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers, and communications between controllers, actuators and/or sensors may be accomplished using a direct wired link, a networked communications bus link, a wireless link or another suitable communications link. Communications includes exchanging data signals in suitable forms, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

During engine operation, such as to provide propulsion power for a vehicle, particulate matter may be generated and filtered out of the exhaust gas feedstream 18 by the particulate filter 24. The controller 15 may periodically execute particulate filter regeneration routines to oxidize and thus remove stored particulate matter from the particulate filter 24 during engine operation. However, certain operator driving routines, travel routes, and other conditions may preclude execution of a particulate filter regeneration routine. This may eventually result in the particulate filter 24 containing particulate matter in an amount that is greater than a maximum threshold, which may cause a driver information system or related device to indicate to a vehicle operator that there is a need for service.

A service center may employ the service tool 40 to communicate with the controller 15, including interrogating the controller 15 to verify that the particulate filter 24 contains an amount of particulate matter that is greater than a maximum threshold. The service tool 40 may communicate with the controller 15, including commanding the controller 15 to execute a particulate filter service routine 36, which includes controlling operation of the engine 10 in a manner described herein.

The particulate filter service routine 36 includes control routines in the form of algorithms, calibrations, and tables that control operation of the engine 10 at a low load, high speed operating point, monitor the exhaust gas feedstream 18, and command the engine 10 to implement post-injection fueling via the fuel injectors 13 to regenerate the particulate filter 24 under controlled operating conditions. Monitoring the exhaust gas feedstream 18 preferably includes determining a first temperature upstream of the oxidation catalyst, i.e., temperature T1 as measured by the first temperature sensor 30, determining a second temperature downstream of the oxidation catalyst and upstream of the particulate filter, i.e., temperature T2 as measured by the second temperature sensor 32, and determining an exhaust gas flowrate. By way of a non-limiting example, the exhaust gas flowrate may be determined based upon engine intake airflow. Post-injection fueling is a process wherein the fuel injectors 13 are commanded to directly inject fuel in the cylinders 11 of the engine 10 such that at least a portion of the post-injection fuel passes unburnt through the cylinders 11 and into the exhaust aftertreatment system 20 as part of the exhaust gas feedstream 18. The particulate filter service routine 36 commands post-injection fueling in the engine 10, wherein at least a portion of the post-injection fuel passes unburnt through the cylinders 11 and into the exhaust aftertreatment system 20 as part of the exhaust gas feedstream 18. The unburnt post-injection fuel oxidizes in the oxidation catalyst 22, causing an increase in the temperature of the exhaust gas feedstream 18 that can pass into the particulate filter 24 to oxidize the particulate matter that has been stored in the particulate filter 24, and thus regenerate the particulate filter 24.

The particulate filter service routine 36 includes a warm-up phase and a steady-state phase. The warm-up and steady-state phases of the particulate filter service routine 36 include controlling post-injection fueling in a manner that is responsive to temperature operating limits to prevent operation at temperatures that could cause deterioration or irreversible harm to the particulate filter 24. In one embodiment, an operating temperature limit may be defined in terms of a temperature at the outlet of the particulate filter 24. The warm-up phase is associated with increasing the temperature of the particulate filter 24 to achieve a target temperature that is associated with regenerating the particulate filter 24. The steady-state phase is associated with maintaining the temperature of the particulate filter 24 at the target temperature effect regeneration of the particulate filter 24 and thus complete the regeneration process after a period of time associated with such operation.

The post injection fueling control preferably includes an open-loop element and a closed-loop element. The open-loop element determines a quantity of fuel for the post-injection fueling that is determined based upon an enthalpy relation between the fuel and the target temperature in the particulate filter 24 to effect regeneration. Such determination is understood by those skilled in the art, and not described herein in detail. The closed-loop element preferably employs a PID (proportional-integral-derivative) controller to provide control of the post-injection fueling in response to temperature feedback from the particulate filter 24 in relation to the target temperature in the particulate filter 24 to effect regeneration. In one embodiment, the target temperature is measured in terms of the second temperature downstream of the oxidation catalyst 22 and upstream of the particulate filter 24, i.e., temperature T2 204 as measured by the second temperature sensor 32. The open-loop and closed-loop elements of the post injection fueling control are predominant during the steady-state phase of the particulate filter service routine 36. During execution of the warm-up phase of the particulate filter service routine 36, the post injection fueling is controlled to effect a smooth increase in the temperature of the particulate filter 24 to the target temperature for regenerating the particulate filter 24 without temperature overshoot. This operation is described with reference to FIGS. 2 and 3.

Figure 2:
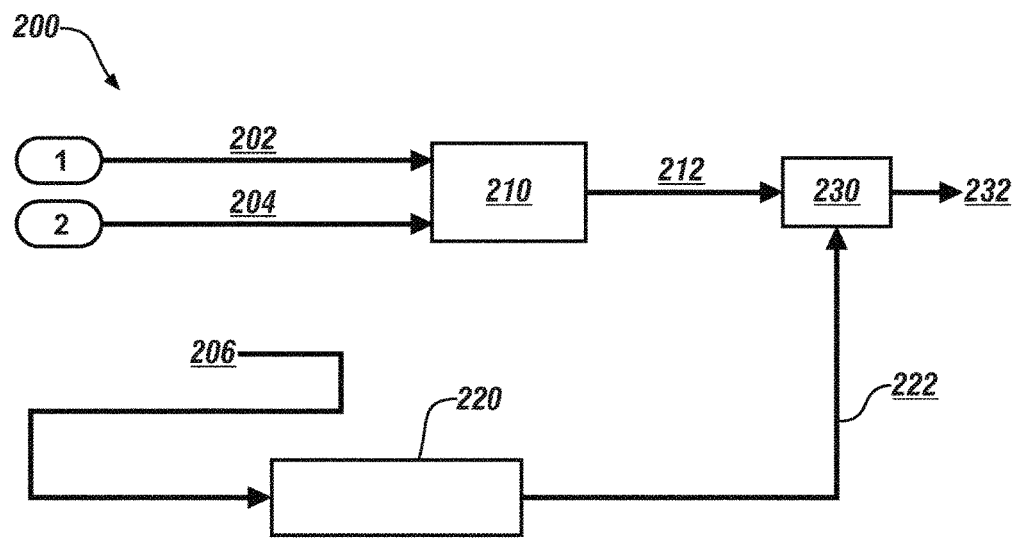
FIG. 2 schematically shows a functional block diagram of a first routine for controlling post-injection fueling to the engine of a particulate filter service routine, in accordance with the disclosure.

Referring now to FIG. 2, with continued reference to the engine 10 and controller 15 described with reference to FIG. 1, a functional block diagram of a first routine 200 is schematically shown for controlling post-injection fueling to the engine 10, including during the warm-up phase of the particulate filter service routine 36. Inputs to the first routine 200 include the first temperature upstream of the oxidation catalyst, i.e., temperature T1 202 as measured by the first temperature sensor 30, the second temperature downstream of the oxidation catalyst 22 and upstream of the particulate filter 24, i.e., temperature T2 204 as measured by the second temperature sensor 32, and an estimated soot level 206, as may be determined by the virtual sensor 34. Temperatures T1 202 and T2 204 are input to a two-dimensional calibration table 210, which determines an initial post-injection fueling quantity 212 based thereon. The initial post-injection fueling quantity 212 is a magnitude of post-injection fueling that is required to achieve the target temperature in the particulate filter 24 that causes oxidation of the particulate matter to effect its regeneration. The target temperature is limited to minimize likelihood of causing operation at temperatures that could cause deterioration or irreversible harm to the particulate filter 24.

The first routine 200 employs the estimated soot level 206 to select or otherwise determine a correction factor 222, using a second calibration table 220 that includes a selectable value for the correction factor 222 in relation to the soot level.

The initial post-injection fueling quantity 212 is combined with the correction factor 222 using a multiplication operation 230 to determine a final or commanded post-injection fueling quantity 232 that may be employed by the first routine 200 for controlling post-injection fueling to the engine 10 during the warm-up phase. The second calibration table 220 may be of the following form, as set forth in Table 1.

TABLE 1

| Soot level (%) | 100 | 110 | 120 | 130 | 140 | 150 | 160 | 170 | 180 | 190 | 200 |
|---|---|---|---|---|---|---|---|---|---|---|---|
| Correction Factor | 1.0 | 0.9 | 0.8 | 0.7 | 0.6 | 0.5 | 0.4 | 0.3 | 0.2 | 0.1 | 0.0 |

For soot levels that are less than or equal to 100% of a maximum threshold for the soot loading, the correction factor is 1.0, meaning that the commanded post-injection fueling quantity 232 is equal to the initial post-injection fueling quantity 212. Thus, when the soot level is less than 100% of the maximum threshold for soot loading, the regeneration time is unaffected. When the soot level is greater than the maximum threshold for soot loading, the correction factor is employed to reduce the initial post-injection fueling quantity 212 during the warm-up phase, in accordance with the values set forth in Table 1.

Figure 3:
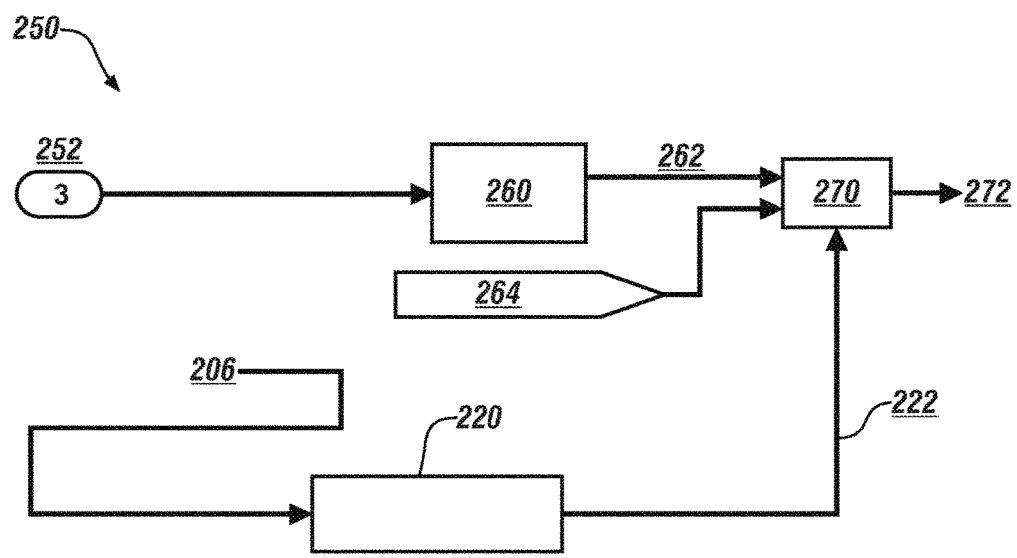
FIG. 3 schematically shows a functional block diagram of a first routine for controlling post-injection fueling to the engine of a particulate filter service routine, in accordance with the disclosure.

Referring now to FIG. 3, with continued reference to the engine 10 and controller 15 described with reference to FIG. 1, a functional block diagram of a second routine 250 is schematically shown for controlling post-injection fueling to the engine 10 during the warm-up phase of the particulate filter service routine 36, which includes reducing the post injection release during the DPF service regeneration warm-up phase in relation to the soot level, and reducing the inlet temperature gradient target during the service regeneration warm-up in relation to the soot level.

Inputs to the second routine 250 include exhaust gas flowrate 252 and the estimated soot level 206, as may be determined by the virtual sensor 34. The exhaust gas flowrate 252 is input to a one-dimensional calibration table 260, which determines an initial temperature gradient 262 based thereon. The initial temperature gradient 262 is a temperature gradient, in terms of degrees C./second, that is necessary to achieve the target temperature in the particulate filter 24 to effect its regeneration. The target temperature is limited to minimize likelihood of causing operation at temperatures that could cause deterioration or irreversible harm to the particulate filter 24. The initial temperature gradient 262 is selected to achieve an increase in the temperature of the particulate filter 24 to effect regeneration while minimizing temperature overshoot. The initial temperature gradient 262 may be associated with regeneration of the particulate filter 24 with the particulate filter 24 at a known soot loading level, e.g., at 100% of the maximum threshold for soot loading. The initial temperature gradient 262 is combined with a timer element 264 to effect an incremental increase in the temperature. The timer element 264 may be configured to define or limit a maximum increase in temperature for a given period of time, e.g., degrees C./100 ms.

The second routine 250 employs the estimated soot level 206 to determine the correction factor 222, using the second calibration table 220 that includes a selectable value for the correction factor 222 in relation to the soot level.

The initial temperature gradient 262 is combined with the timer element 264 and the correction factor 222 using a multiplication operation 270 to determine a final warm-up temperature gradient 272 that may be employed controlling post-injection fueling to the engine 10 during the warm-up phase.

For soot levels that are less than or equal to 100% of the maximum threshold for the soot loading, the correction factor is 1.0, meaning that the final warm-up temperature gradient 272 is equal to the initial warm-up temperature gradient 272. Thus, when the soot level is less than 100% of the maximum threshold for soot loading, the warm-up temperature gradient is unaffected. When the soot level is greater than 100% of the maximum threshold for soot loading, the correction factor 222 is employed to reduce the initial warm-up temperature gradient 272 during the warm-up phase, in accordance with the values set forth in Table 1.

Thus, during the warm-up phase of the particulate filter service routine 36, post injection fueling is not controlled to achieve the target temperature. Instead, the target temperature waits for the measured temperature, with a certain distance (15-20° C.), until the first temperature set-point. The result is that there is a slow-down in the measured temperature increase, with the magnitude of the slow-down in the measured temperature increase being dependent upon the soot level. This reduces the likelihood that the target temperature will increase too quickly with regard to the measured temperature, and thus minimize the influence of the post injection closed loop control during the warm-up phase, as the temperature target waits for the measured temperature.

As such, a service regeneration procedure may be activated by a service technician via the service tool 40. When conditions are met, the controller 15 controls the engine 10 to an engine operating point of high engine speed and low engine load to perform a complete regeneration of the particulate filter 24, respecting as first priority a maximum temperature target, which may be 900° C. at its outlet. This may include implementing a software modification in order to allow the system to perform safely a service regeneration of the particulate filter 24 while not reducing the current soot level operating range of the service regeneration.

The first routine 200 and the second routine 250 effect a reduction of the quantity of the post injection fueling that is gradually injected during the warm-up by reducing post-injection fueling in relation to the first temperature T1 as measured by the first temperature sensor 30, the second temperature T2 as measured by the second temperature sensor 32 and the exhaust gas flowrate.

The functional block diagrams described herein illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated hardware-based systems that perform the specified functions or acts, or combinations of dedicated hardware and computer instructions. These computer program instructions may also be stored in a computer-readable medium that can direct a controller or other programmable data processing apparatus to function in a particular manner, such that the instructions stored in the computer-readable medium produce an article of manufacture including an instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling operation of a direct-injection internal combustion engine disposed to supply an exhaust gas feedstream to an exhaust aftertreatment system, wherein the exhaust aftertreatment system includes an oxidation catalyst disposed upstream of a particulate filter, the method comprising:
executing, via a controller, a particulate filter service routine in response to a command to regenerate the particulate filter, wherein the particulate filter service routine includes a warm-up phase and a steady-state phase, the service routine including:
determining a first temperature in the exhaust gas feedstream upstream of the oxidation catalyst and a second temperature in the exhaust gas feedstream downstream of the oxidation catalyst and upstream of the particulate filter;
determining a soot level in the particulate filter;
determining an exhaust gas flowrate;
determining a preferred warm-up temperature gradient in the particulate filter based upon the exhaust gas flowrate and the soot level;
executing the warm-up phase of the particulate filter service routine based upon the preferred warm-up temperature gradient; and
controlling operation of the engine to achieve the preferred warm-up temperature gradient in the particulate filter during the warm-up phase.

2. The method of claim 1, further comprising the command to regenerate the particulate filter being generated by a service procedure that is activated via a service tool that is in communication with the controller.

3. The method of claim 1, wherein determining the preferred warm-up temperature gradient in the particulate filter based upon the exhaust gas flowrate and the soot level comprises:
determining an initial temperature gradient to achieve a target temperature in the particulate filter to effect regeneration; and
adjusting the initial temperature gradient based upon the soot level.

4. The method of claim 3, wherein the initial temperature gradient is selected to achieve a target temperature in the particulate filter to effect regeneration and minimize temperature overshoot beyond the target temperature.

5. The method of claim 3, wherein adjusting the initial temperature gradient based upon the soot level comprises maintaining the initial temperature gradient when the soot level is less than 100% of the maximum threshold for soot loading.

6. The method of claim 3, wherein adjusting the initial temperature gradient based upon the soot level comprises reducing the initial warm-up temperature gradient during the warm-up phase when the soot level is greater than 100% of the maximum threshold for soot loading.

7. The method of claim 1, wherein executing the warm-up phase of the particulate filter service routine comprises controlling post-injection fueling through the internal combustion engine to the exhaust gas feedstream based upon the preferred warm-up temperature gradient.

8. The method of claim 1, wherein controlling operation of the engine to achieve the preferred warm-up temperature gradient in the particulate filter during the warm-up phase comprises controlling a magnitude of post-injection fueling during the warm-up phase to achieve the preferred warm-up temperature gradient in the particulate filter.

9. The method of claim 1, wherein the steady-state phase of the particulate filter service routine is associated controlling magnitude of post-injection fueling to maintain the temperature of the particulate filter at a target temperature to effect regeneration of the particulate filter.

10. A method for controlling operation of an internal combustion engine fluidly coupled to an oxidation catalyst disposed upstream of a particulate filter, the method comprising:
determining a soot level in the particulate filter;
determining an exhaust gas flowrate;
executing, via a controller, a particulate filter service routine, including:
determining a first temperature in the exhaust gas feedstream upstream of the oxidation catalyst and a second temperature in the exhaust gas feedstream downstream of the oxidation catalyst and upstream of the particulate filter;
determining a preferred warm-up temperature gradient in the particulate filter based upon the exhaust gas flowrate and the soot level; and
executing a warm-up phase of the particulate filter service routine based upon the preferred warm-up temperature gradient;
wherein a magnitude of post-injection fueling during the warm-up phase is controlled to achieve the preferred warm-up temperature gradient in the particulate filter.

11. An internal combustion engine, comprising:
a multi-cylinder internal combustion engine including a plurality of fuel injectors disposed to directly inject fuel into each cylinder, the internal combustion engine fluidly coupled to an exhaust aftertreatment system;
the exhaust aftertreatment system including an oxidation catalyst disposed upstream of a particulate filter, a first temperature sensor disposed in the exhaust gas feedstream upstream of the oxidation catalyst and a second temperature sensor disposed in the exhaust gas feedstream downstream of the oxidation catalyst and upstream of the particulate filter; and
a controller, operatively connected to the internal combustion engine and the plurality of fuel injectors, and in communication with the first temperature sensor and the second temperature sensor, the controller including an instruction set, the instruction set executable to:
execute a particulate filter service routine in response to a command to regenerate the particulate filter, wherein the particulate filter service routine includes a warm-up phase and a steady-state phase, the service routine disposed to:
- determine a first temperature from the first temperature sensor and determine a second temperature from the second temperature sensor,
- determine a soot level in the particulate filter,
- determine an exhaust gas flowrate,
- determine a preferred warm-up temperature gradient in the particulate filter based upon the exhaust gas flowrate and the soot level,
- execute the warm-up phase of the particulate filter service routine based upon the preferred warm-up temperature gradient, and
- control operation of the engine to achieve the preferred warm-up temperature gradient in the particulate filter during the warm-up phase.

12. The internal combustion engine of claim 11, further comprising a service tool in communication with the controller, wherein the command to regenerate the particulate filter is generated by a service procedure that is communicated from the service tool to the controller.

13. The internal combustion engine of claim 11, wherein the service routine disposed to determine the preferred warm-up temperature gradient in the particulate filter based upon the exhaust gas flowrate and the soot level comprises the service routine disposed to:
- determine an initial temperature gradient to achieve a target temperature in the particulate filter to effect regeneration; and
- adjust the initial temperature gradient based upon the soot level.

14. The internal combustion engine of claim 13, wherein the initial temperature gradient is selected to achieve a target temperature in the particulate filter to effect regeneration and minimize temperature overshoot beyond the target temperature.

15. The internal combustion engine of claim 13, wherein the service routine disposed to adjust the initial temperature gradient based upon the soot level comprises the service routine disposed to maintain the initial temperature gradient when the soot level is less than 100% of the maximum threshold for soot loading.

16. The internal combustion engine of claim 13, wherein the service routine disposed to adjust the initial temperature gradient based upon the soot level comprises the service routine disposed to reduce the initial warm-up temperature gradient during the warm-up phase when the soot level is greater than 100% of the maximum threshold for soot loading.

17. The internal combustion engine of claim 11, wherein the service routine disposed to execute the warm-up phase of the particulate filter service routine comprises the service routine disposed to control post-injection fueling through the internal combustion engine to the exhaust gas feedstream based upon the preferred warm-up temperature gradient.

18. The internal combustion engine of claim 11, wherein the service routine disposed to control operation of the engine to achieve the preferred warm-up temperature gradient in the particulate filter during the warm-up phase comprises the service routine disposed to control a magnitude of post-injection fueling during the warm-up phase to achieve the preferred warm-up temperature gradient in the particulate filter.

19. The internal combustion engine of claim 11, wherein the steady-state phase of the particulate filter service routine is associated controlling magnitude of post-injection fueling to maintain the temperature of the particulate filter at a target temperature to effect regeneration of the particulate filter.

* * * * *